United States Patent
Takaku (10) Patent No.: US 7,218,312 B2
(45) Date of Patent: May 15, 2007

(54) INFORMATION DISPLAY DEVICE

(75) Inventor: Norio Takaku, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 440 days.

(21) Appl. No.: 10/676,010

(22) Filed: Oct. 2, 2003

(65) Prior Publication Data

US 2004/0066370 A1   Apr. 8, 2004

(30) Foreign Application Priority Data

Apr. 10, 2002   (JP) .............................. 2002-292577

(51) Int. Cl.
  G09G 5/08   (2006.01)
  G09G 5/00   (2006.01)
(52) U.S. Cl. .................. 345/158; 345/173; 715/810
(58) Field of Classification Search ........ 345/173–179, 345/156, 158; 715/810, 811, 814, 844, 853, 715/854
  See application file for complete search history.

(56) References Cited

U.S. PATENT DOCUMENTS 5,594,469 A * 1/1997 Freeman et al. ............ 345/158
5,627,547 A   5/1997 Ramaswamy et al.
6,031,519 A * 2/2000 O'Brien ...................... 345/156
2002/0055793 A1   5/2002 Yoshioka
2003/0025676 A1* 2/2003 Cappendijk ................. 345/173

FOREIGN PATENT DOCUMENTS

DE   40 01 062 A1   7/1991
EP    1 241 558 A2   9/2002

OTHER PUBLICATIONS

Patent Abstracts of Japan, vol. 1996, No. 03, Mar. 29, 1996 & JP 07 306055 A (Niles Parts Co Ltd), Nov. 21, 1995.

* cited by examiner

Primary Examiner—Dennis-Doon Chow
(74) Attorney, Agent, or Firm—Wenderoth, Lind & Ponack, L.L.P.

(57) ABSTRACT

An information display device includes a display with a display screen, a multifunction switch, an IR sensor detecting whether or not an operator's hand is in a range around the multifunction switch, and a menu display controller. The menu display controller causes, based on a sensor signal from the IR sensor, a main menu to be displayed on the display screen when an operator's hand comes in the range. When the operator's hand is taken off the multifunction switch, the menu non-display window is displayed on the display screen after a time-out time has passed.

8 Claims, 5 Drawing Sheets

INFORMATION DISPLAY DEVICE

BACKGROUND OF THE INVENTION

1. Field of the Invention

The present invention relates to an information display device, and more particularly, it belongs to a technical field of an information display device suitable for displaying an operation menu at the time of blind operation of on-vehicle apparatuses by a multifunction switch, the on-vehicle apparatuses being a navigation system, an audio apparatus, and so on mounted on a vehicle.

2. Description of the Related Art

Conventionally, a multifunction switch has been well known that is intended for use in operating a navigation system, an audio apparatus, an airconditioner, and so on by blind operation from a driver's seat or a front passenger's seat of a vehicle while the vehicle is being driven (for example, refer to Japanese Patent Laid-open No. 2000-276976).

This multifunction switch is so structured that operation switches are disposed at positions where respective fingers are situated when an operator holds the multifunction switch, thereby enhancing operability, and it is provided with a jog encoder switch with a push function, thereby realizing diversified switch operations. This multifunction switch enables an operator to operate the apparatuses by blind operation while seeing a hierarchical operation menu displayed on a display screen mounted on a vehicle.

In a conventional information display device using the above-described multifunction switch, the following two methods have been typically implemented as methods for displaying an operation menu on a display screen.

(1) Menu display is kept on stand-by at a normal time and the menu is displayed by switch operation. When no switch operation is executed for a predetermined period of time, the menu is erased from a display screen.

(2) A part of the screen is reserved as a menu display area for constantly keeping the menu displayed thereon.

However, the former method of the above prior arts requires, before the operation of the apparatus, switch operation for the display of an initial menu, which poses a problem of low operability.

In the latter method, the screen appears cluttered due to a large amount of information displayed on the screen. Moreover, an area for displaying other apparatus information becomes small. This is especially disadvantageous for a navigation function since a map display area is forced to be small.

SUMMARY OF THE INVENTION

The present invention is made in view of the problems stated above, and an object thereof is to provide an information display device that is excellent in operability in which quick menu display is possible when an operator operates a switch for an apparatus and a menu non-display window appears again after the switch operation is completed, thereby preventing the obstruction to a display area of apparatus information.

In order to achieve the objects stated above, an information display device according to the present invention includes: a display having a display screen on which information on an apparatus is displayed; an input means including an operation switch through which operation control of the apparatus is performed and outputting a switch signal when the operation switch is operated; a proximity detector that detects that an operator's hand comes in a range which is a predetermined distance away from the input means; and a menu display controller that causes a hierarchical menu showing an operation item group of the apparatus to be displayed on the display screen in response to the switch signal from the input means when the operator's hand comes in the range, and terminates menu display when the operator's hand is taken off the input means.

In the information display device, a menu is displayed on the display screen when an operator's hand comes in the range, in other words, immediately before the operator touches the input means. Then, menu display is terminated when the operator's hand is taken off the input means.

Therefore, compared with the prior art requiring switch operation for menu display, the operation procedure steps can be lessened, so that the operation burden on an operator can be lightened. In addition, since a menu is displayed only when the apparatus is to be operated, an area for constant display of the menu is not required, so that a display area of other apparatus information can be enlarged, compared with the prior art in which a part of a screen is set as a menu display area.

Further, in the information display device, the menu display is continued while the operator's hand is in the range.

Here, the control performed in the device of the prior art is such that, when a predetermined period of time has passed after switch operation, menu display is terminated and a display screen is changed to a menu non-display window. However, in this case, when an operator interrupts the switch operation for a predetermined period of time or longer, the operator is forced to take trouble of searching again for a desired menu from an initially displayed menu on the top hierarchical level (initial menu).

In the information display device, the state in which the operator's hand is in the range is judged to indicate that the operator has an intention to continue the switch operation, and accordingly, the menu display is continued, which can save the operator the aforesaid trouble.

The information display device may further include: a counter that counts a period of time during which the operator's hand is in the range; and a delay time setting means for setting, based on the counted period of time, a delay time that is a period of time from an instant at which the operator's hand is taken off the input means until the menu display is terminated, and, when the operator's hand is taken off the input means, the menu display controller terminates the menu display after the set delay time has passed.

In the information display device, the period of time during which the operator's hand is in the range is counted in advance, and when the operator's hand is taken off the input means, the menu display is continued for the delay time that is set based on the counted period of time. Therefore, it is possible to reduce the trouble of repeating a previous operation when the operator returns to the switch operation after momentarily concentrating on driving due to some unexpected disturbance which occurs during the switch operation.

Here, menus on upper hierarchical levels close to the initial menu are accessible from the initial menu with a small number of switch operations, but menus on lower hierarchical levels require a larger number of switch operations, which lengthens the accessible time from the initial menu. Therefore, based on such recognition as "the period of time during which the operator's hand is in the range is longer=a menu on a lower hierarchical level is displayed", the delay time is set longer for a menu on a lower hierarchical level. In this manner, the operation burden of executing the display of a menu on a lower hierarchical level can be lightened.

The delay time setting means may set the delay time longer as a level of a displayed menu is lower in hierarchy, when a plurality of menus are provided in a hierarchical manner on lower levels of an initial menu that is a menu displayed when the operator's hand comes in the range.

In the information display device, as a level of a finally displayed menu is lower in hierarchy, the delay time is set longer, which can lighten the burden on the operator, similarly to the above effect.

The information display device may further include an operation history memory that stores an operation history based on the inputted switch signal, and the delay time setting means sets the delay time based on the operation history.

In the information display device, the delay time is set based on the operation history, which makes it possible to set the delay time according to each operator.

For example, in the case of an operator who often makes a display selection of a menu on an upper hierarchical level relatively close to the initial menu, it is inferred that this operator often interrupts the operation while this menu is being displayed. Therefore, the delay time of a menu that is frequently used is set longer even if it is a menu on an upper hierarchical level, so that the trouble of redisplaying a desired menu can be reduced.

The information display device may further include an operation completion detector that detects operation completion of the apparatus, and the delay time setting means sets the delay time shorter when the operation of the apparatus is completed than when the operation of the apparatus is not completed.

In the information display device, the delay time is set shorter when the operation of an apparatus is completed than when the operation of an apparatus is not completed, so that the display of a menu on the display screen for a long time, thus obstructing the display of necessary apparatus information, even though the operation is completed can be prevented.

DETAILED DESCRIPTION OF THE PREFERRED EMBODIMENTS

Hereinafter, an embodiment of the present invention will be explained based on the drawings.

Figure 1:
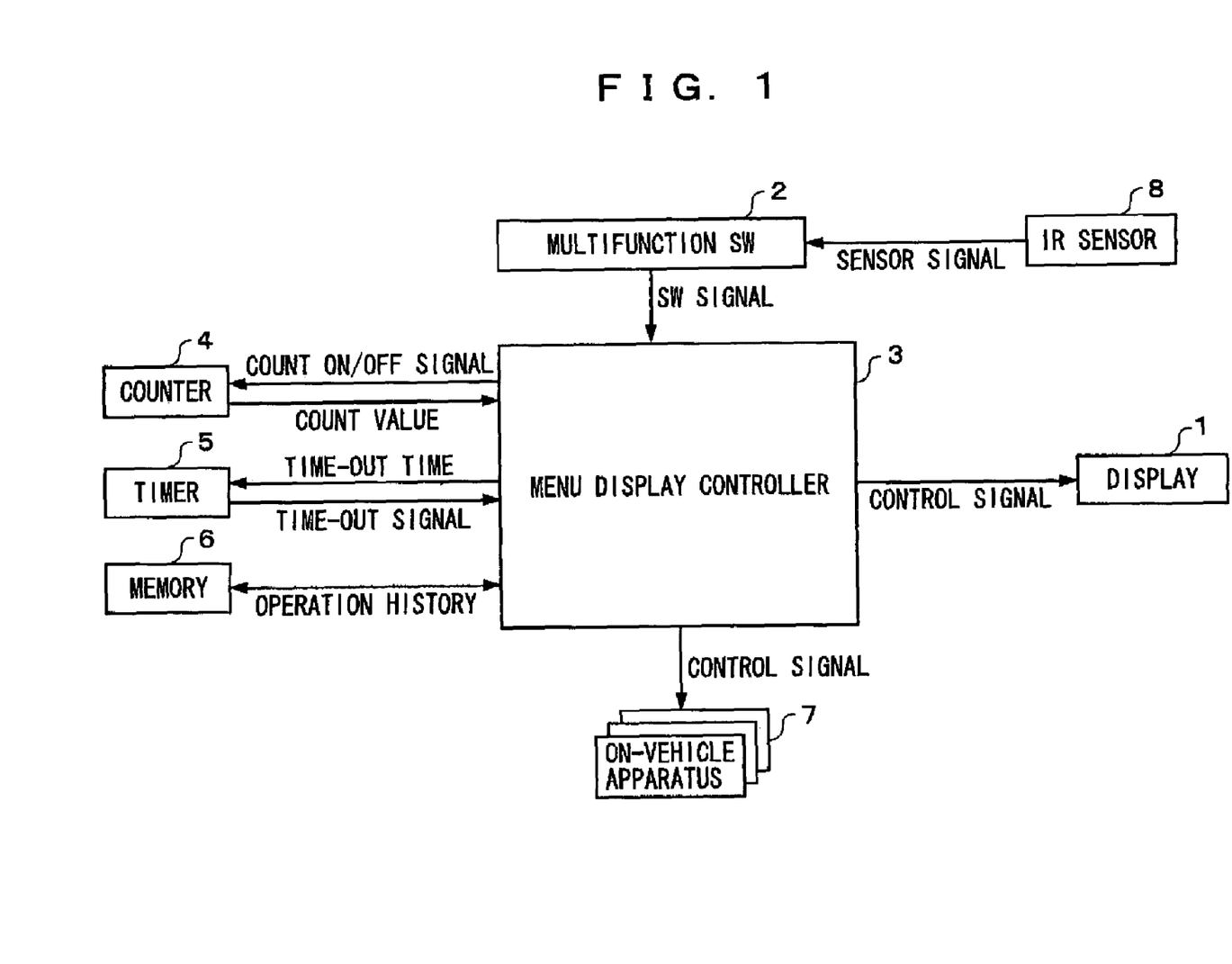
FIG. 1 is a block diagram showing the configuration of an information display device of this embodiment.

FIG. 1 is a block diagram showing the configuration of an information display device of this embodiment.

The display device comprises a display 1, a multifunction switch (corresponding to an input means) 2, a menu display controller 3, a counter 4, a timer 5, a memory (corresponding to an operation history memory) 6, and on-vehicle apparatuses 7 such as a navigation system, an audio apparatus, and an airconditioner.

The display 1 has a display screen on which information on the on-vehicle apparatuses 7 such as the navigation system, the audio apparatus, and the airconditioner is displayed. Further, the display screen displays a hierarchical menu showing an operation control command group of each of the on-vehicle apparatuses 7 when a driver or a passenger in a front passenger's seat (hereinafter, referred to as an operator) is to operate any one of the on-vehicle apparatuses 7.

Figure 2:
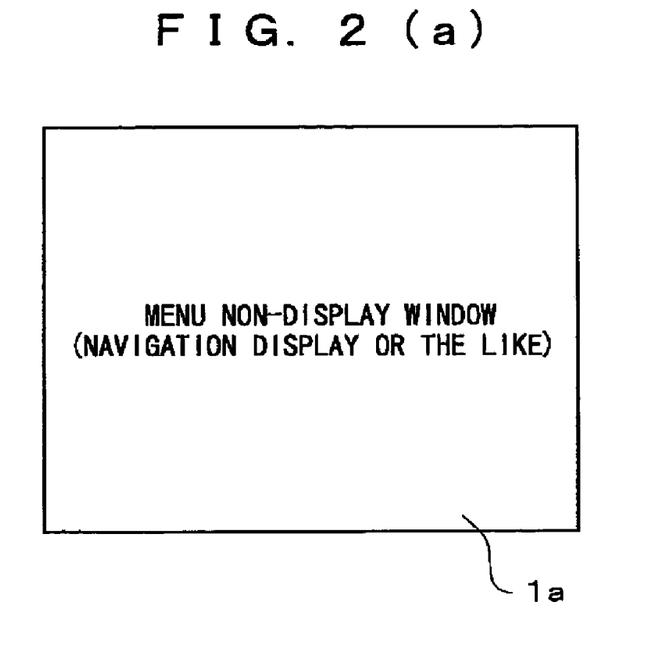
FIG. 2(a) and FIG. 2(b) are views each showing a display screen of a display.

FIG. 2(a) and FIG. 2(b) are views each showing a display screen 1a of the display 1. FIG. 2(a) shows a menu non-display window, on which, for example, navigation information or the like is being displayed. FIG. 2(b) shows a state when a main menu (initial menu) A that is a menu on a top hierarchical level is displayed on a part of the display screen 1a. Four items, namely, audio, airconditioner, navigation, and command are displayed in this main menu A.

Figure 3:
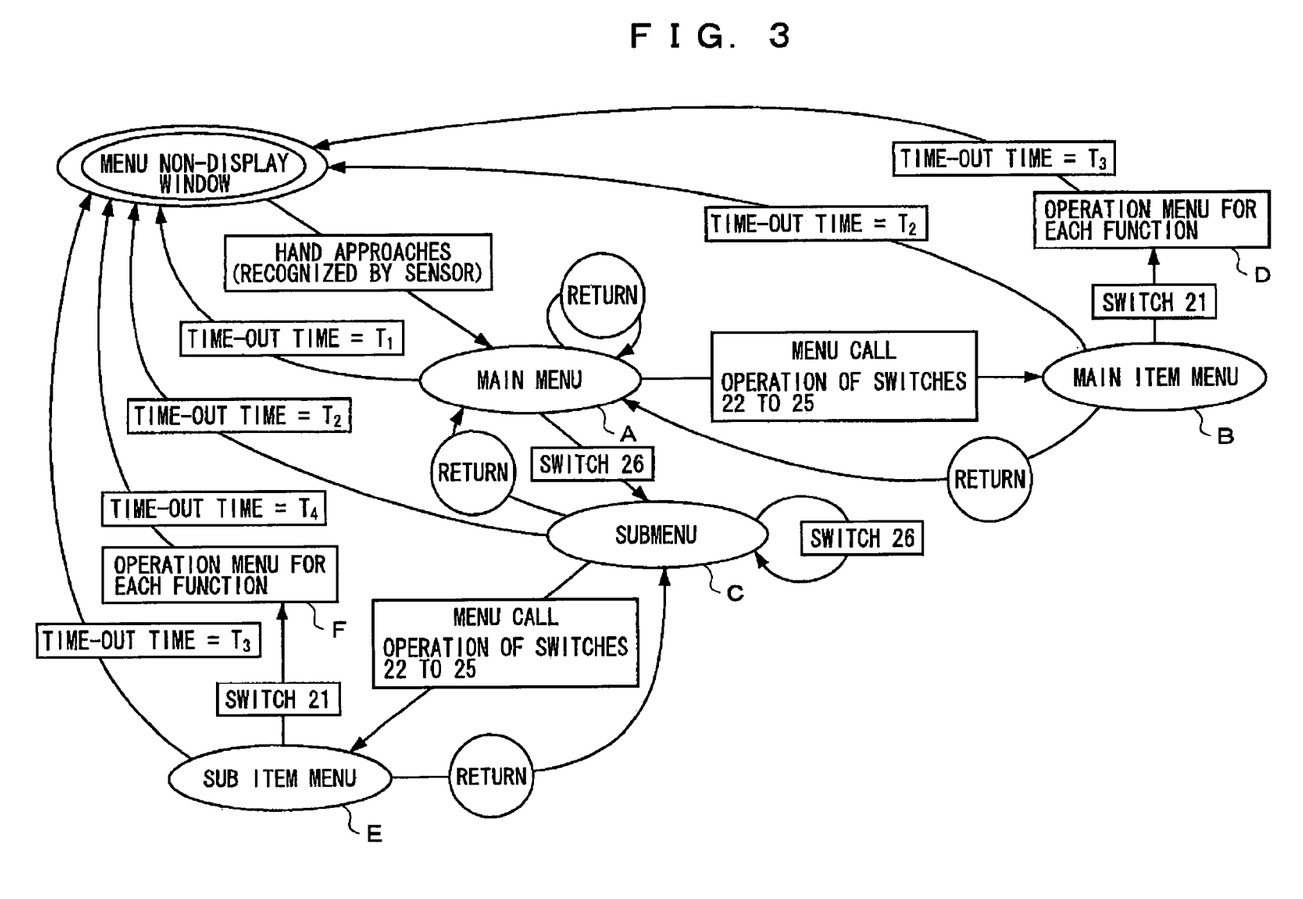
FIG. 3 is a view showing a hierarchical structure of a menu.

Note that, as shown in FIG. 3, a main item menu B and a submenu C are provided as menus on lower hierarchical levels of the main menu A. Functions of an item selected in the main menu A are displayed in the main item menu B. In the submenu C, items such as visual, vehicle information, option, and setting are displayed.

Further, on a lower hierarchical level of the main item menu B, an operation menu D for each function selected in the main item menu B is provided. Moreover, on a lower hierarchical level of the submenu C, provided is a sub item menu E in which each function of the item selected in the submenu C is displayed, and an operation menu F for each function selected in the sub item menu E is provided on a lower hierarchical level of the sub item menu E. When one of the operation items displayed in the operation menu D or F is selected, the selected item is executed.

The aforesaid multifunction switch 2 is a switch through which a selection from a menu displayed on the display screen of the display 1 is made to operate any one of the on-vehicle apparatuses 7, and it has an IR sensor (corresponding to a proximity detector) 8 that detects whether or not an operator's hand is in a range 28 which is a predetermined distance away from the multifunction switch 2. The structure of this multifunction switch 2 will be described later.

The aforesaid menu display controller 3 is intended for controlling screen display of the display 1 according to a switch input from the multifunction switch 2. Further, according to an operation control command of the on-vehicle apparatus 7 selected by the operator from the menu, the menu display controller 3 outputs a control signal to a control section of the on-vehicle apparatus 7. The menu display controller 3 functions as a delay time setting means.

The aforesaid counter 4 measures the period of time (count value) between the detection of the operator's hand by the IR sensor 8 and an instant at which the operator's hand becomes undetected and outputs the count value to the menu display controller 3.

The aforesaid timer 5 counts down a time-out time that is set by the menu display controller 3 based on the count value and outputs a time-out signal to the menu display controller 3.

The aforesaid memory 6, which is a nonvolatile memory device such as EEPROM, stores an operation history of the operator based on a switch signal outputted from the multifunction switch 2 to the menu display controller 3.

Figure 4:
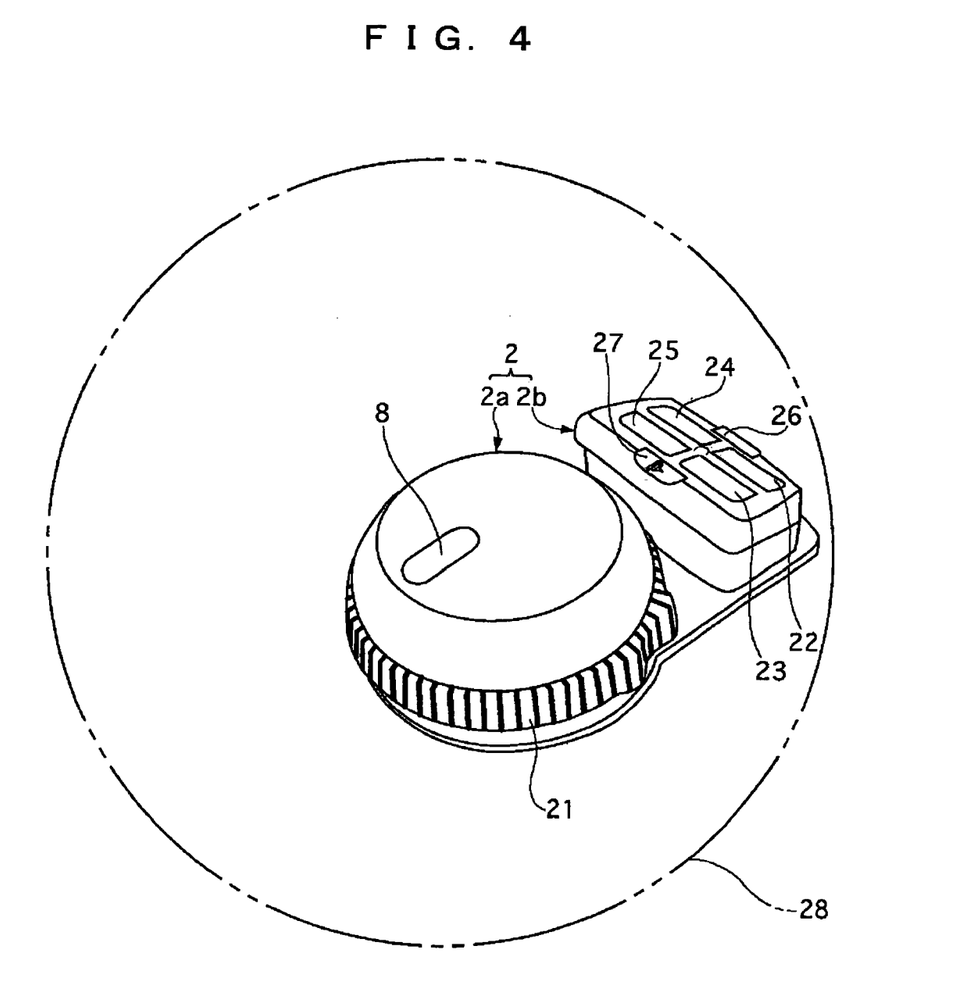
FIG. 4 is a perspective view of the structure of a multifunction switch 2.

Next, an example of the structure of the multifunction switch 2 will be explained.

FIG. 4 is a perspective view showing the structure of the multifunction switch 2.

The shape of this multifunction switch 2 is such that it is constituted of a grip portion 2a for having an operator's palm placed thereon and a switch portion 2b, which is provided in a front direction of this grip portion 2a, for having operator's four fingers placed thereon.

The aforesaid IR sensor 8 is provided on an upper face of the grip portion 2a. Further, a jog encoder switch 21 that is operated with the thumb is provided on a periphery portion of the grip portion 2a.

On an upper face of the switch portion 2b, provided are four select switches 22 to 25 arranged in a square with a cross-shaped interval therein, a submenu changeover switch 26 positioned on a vehicle front side of these select switches 22 to 25, and a return switch 27 positioned on a vehicle rear side of the select switches 22 to 25. All of them are push-type switches.

The aforesaid select switches 22 to 25 are switches for use in selecting a desired item from the items (audio, airconditioner, navigation, command) displayed in the main menu A or from the items (selection of visual, vehicle information, option, and setting) displayed in the submenu C, and when a switch corresponding to a desired item out of the displayed items is pushed, the main item menu B or the sub item menu E corresponding to the selected item is displayed.

The aforesaid submenu changeover switch 26 is a switch for use in changing the main menu A to the submenu C. The return switch 2 is a switch for use in displaying a menu one-level higher in hierarchy than the menu displayed on the display screen 1a.

In FIG. 3 described above, in the state in which the main menu A is displayed on the display screen 1a of the display 1, the operation of any one of the select switches 22 to 25 causes the main item menu B to be displayed, while the operation of the submenu changeover switch 26 causes the submenu C to be displayed. Further, the operation of any one of the switches 22 to 25 while the submenu C is displayed causes the sub item menu E to be displayed.

The jog encoder switch 21 is used in order to display the operation menu D or E for each function from the main item menu B or the sub item menu E.

Next, the operation will be explained.

Time-out Time Setting Control Process

Figure 5:
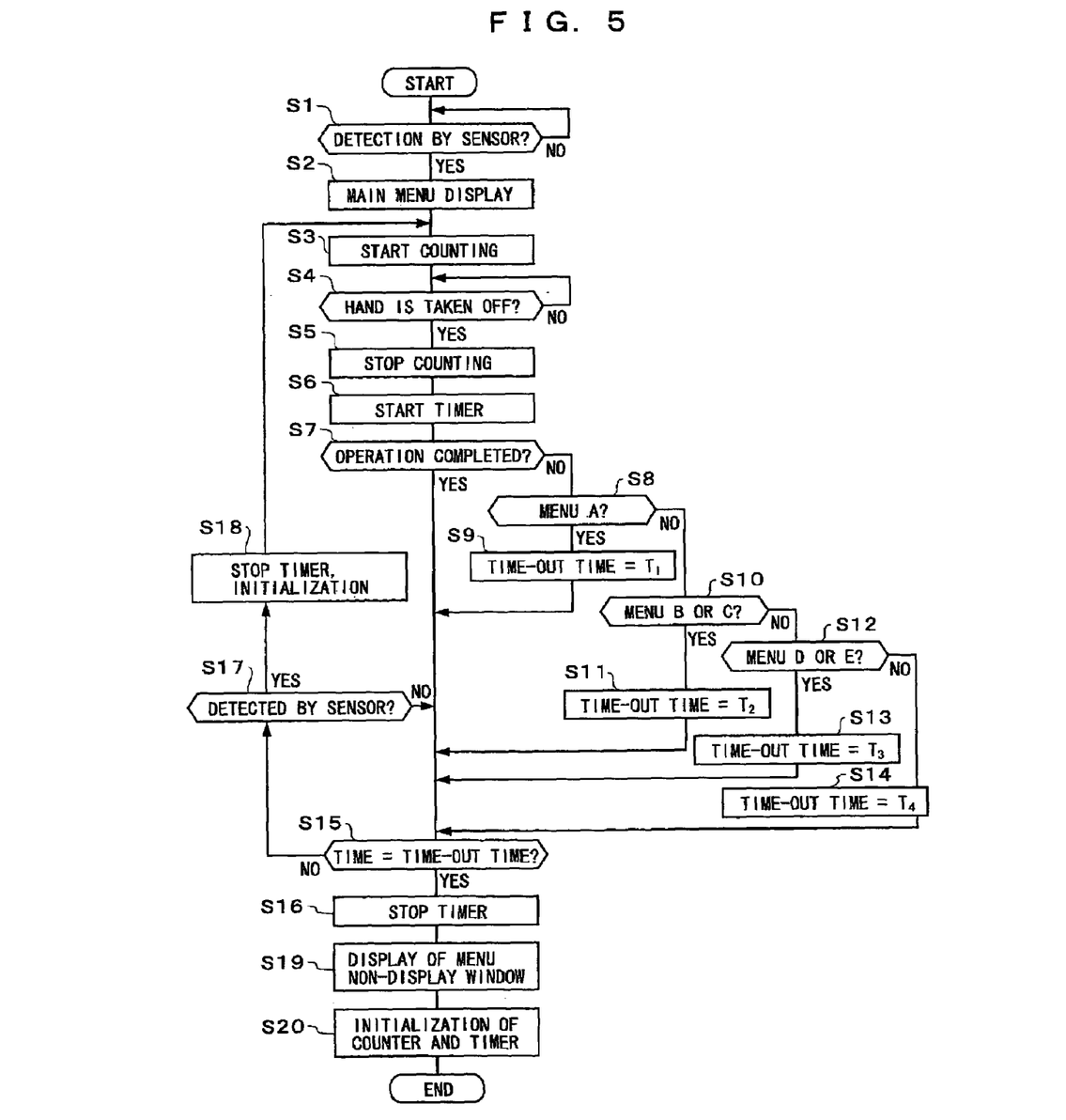
FIG. 5 is a flowchart showing the flow of a time-out time setting control process performed by a menu display controller.

FIG. 5 is a flowchart showing the flow of a time-out time setting control process by the menu display controller 3.

In Step S1, it is detected based on a sensor signal from the IR sensor 8 whether or not the operator's hand is in the range 28 around the multifunction switch 2. When the operator's hand is in the range 28 around the multifunction switch 2, the control proceeds to Step S2. When, on the other hand, the operator's hand is not in the range 28 around the multifunction switch 2, Step S1 is repeated.

In Step S2, a command for the display of the main menu A on the display screen 1a is outputted to the display 1.

In Step S3, a count-ON signal is outputted to the counter 4 so that the counter 4 starts counting.

In Step S4, it is detected based on a sensor signal from the IR sensor 8 whether or not the operator's hand is taken off the multifunction switch 2. When the operator's hand is taken off the multifunction switch 2, the control proceeds to Step S5. When, on the other hand, the operator's hand is in the range 28 around the multifunction switch 2, Step S4 is repeated.

In Step S5, a count-OFF signal is outputted to the counter 4 so that the counter 4 stops counting, and the count value is received.

In Step S6, a time-out time (corresponding to a delay time) $T_0$ is set based on the count value, and the timer 5 is started.

In Step S7, it is detected whether or not the current state is an operation completion state, in other words, whether or not one of the operation items displayed in the operation menu D or F has been already selected. When the operation item has been already selected, the control proceeds to Step S15, and when the operation item has not been selected yet, the control proceeds to Step S8. The operation completion of the apparatus is detected by an operation completion detector. The menu display controller 3 functions as the operation completion detector.

In Step S8, it is judged whether or not the main menu A is displayed on the display screen 1a. When the main menu A is displayed, the control proceeds to Step S9, and otherwise, the control proceeds to Step S10.

In Step S9, a time-out time (corresponding to a delay time) $T_1$ ($T_1 > T_0$) is set based on the count value. This time-out time is set longer as the count value is larger. Note that the set time-out time (corresponding to a delay time) $T_1$ is adjusted according to an operation history stored in the memory 6. For example, when a menu frequently used is displayed, the time-out time is set longer, and when a menu seldom used is displayed, the time-out time is set shorter.

In Step S10, it is judged whether or not the main item menu B or the submenu C is displayed on the display screen 1a. When the main item menu B or the submenu C is displayed, the control proceeds to Step S11, and otherwise, the control proceeds to Step S12.

In Step S11, a time-out time (corresponding to a delay time) $T_2$ ($T_2 > T_1$) is set based on the count value. Adjustment of the set time-out time (corresponding to a delay time) $T_2$ may be further made according to the operation history.

In Step S12, it is judged whether or not the operation menu D or the sub item menu E is displayed on the display screen 1a. When the operation menu D or the sub item menu E is displayed, the control proceeds to Step S13, and when the operation menu F is displayed, the control proceeds to Step S14.

In Step S13, a time-out time (corresponding to a delay time) $T_3$ ($T_3 > T_2$) is set based on the count value. Adjustment of the set time-out time (corresponding to a delay time) $T_3$ may be further made according to the operation history.

In Step S14, a time-out time (corresponding to a delay time) $T_4$ ($T_4 > T_3$) is set based on the count value. Adjustment of the set time-out time $T_4$ (corresponding to a delay time) may be further made according to the operation history.

In Step S15, it is judged whether or not the timer 5 has reached the time-out time based on whether or not the timer 5 has outputted a time-out signal. When the timer 5 has reached the time-out time, the control proceeds to Step S16, and when the timer 5 has not reached the time-out time, the control proceeds to Step S17.

In Step S16, the timer 5 is stopped.

In Step S17, it is detected based on a sensor signal from the IR sensor 8 whether or not the operator's hand is in the range 28 around the multifunction switch 2. When the operator's hand is in the range 28 around the multifunction switch 2, the control proceeds to Step S18. When, on the other hand, the operator's hand is not in the range 28 around the multifunction switch 2, the control returns to Step S15.

In Step S18, the timer 5 is stopped and initialized.

In Step S19, the menu display is terminated, and a command for the display of the menu non-display window on the display screen 1a is outputted to the display 1.

In Step S20, the counter 4 and the timer 5 are initialized, thereby finishing this control.

Next, the effects will be explained.

In the information display device of this embodiment, the effects listed as follows are obtainable.

(1) Based on the sensor signal of the IR sensor 8, the main menu A is displayed on the display screen 1a when the operator's hand comes in the range 28 around the multifunction switch 2, and when the operator's hand is taken off the multifunction switch 2, a menu is erased and the menu non-display window is displayed. This makes it possible to reduce the operation procedure steps to lighten the operation burden on the operator, compared with a prior art requiring switch operation for menu display. In addition, since a menu is displayed only when an apparatus is to be operated, an area for constant display of the menu is not required, so that a display area of other apparatus information can be enlarged, compared with the prior art in which a menu display area is set in a part of a screen.

(2) The menu non-display window is displayed after the time-out time has passed after the operator's hand is taken off the multifunction switch 2. This makes it possible to save the operator the trouble of repeating a previous operation when the operator returns to switch operation after momentarily concentrating on driving due to some unexpected disturbance during the switch operation.

(3) As a menu that is displayed on the display screen 1a when the operator's hand is taken off the multifunction switch 2 is farther from the main menu A in terms of the level in the hierarchy, the time-out time is set longer. This makes it possible to lighten the operation burden in the re-display of the operation menu D or F, or the sub item menu E, which requires a lot of trouble for display, from the main menu A.

(4) The operation history is stored in the memory 6, and as a displayed menu is a more frequently used one, the time-out time is set longer. This makes it possible to reduce the trouble of redisplaying a frequently used menu.

(5) The time-out time $T_0$ in the operation completion state is set shorter than the time-out times $T_1$ to $T_4$ not in the operation completion state. This makes it possible to prevent the display of the menu for a long time in spite of that the operation has been completed.

Hitherto, the embodiment of the present invention is explained, but the specific configuration of the present invention is not limited to this embodiment, and changes in design and so on not departing from the spirit of the present invention are to be embraced in the present invention.

For instance, an example when the IR sensor is used as the proximity detector is shown in this embodiment, but any sensor may be used as long as it is a proximity sensor or a touch sensor capable of detecting a human body. Moreover, the proximity detector may be a separate structure from the input means.

Further, the constitution of menus, the number of menu hierarchical levels, the structure of the multifunction switch (input means), and so on are not limited to those in this embodiment. For example, seesaw switches and other switches may be used as the select switches 22 to 25, the submenu changeover switch 26, and the return switch 27.

What is claimed is:

1. An information display device comprising:
    a display having a display screen on which information regarding an apparatus is displayed;
    an input device including an operation switch through which operation control of the apparatus is performed, the input device being operable to output a switch signal when said operation switch is operated;
    a proximity detector operable to detect when a hand of an operator enters a range which is within a predetermined distance away from said input device;
    a menu display controller operable to cause a menu of a hierarchical menu showing an operation item group of the apparatus to be displayed on said display screen in response to the switch signal from said input device when the hand of the operator enters the range, and terminate the display of the menu of the hierarchical menu after the hand of the operator is taken off of said input device;
    a counter operable to count a period of time during which the hand of the operator is in the range; and
    a delay time setting means for setting, based on the period of time counted by said counter, a delay time that is a period of time from an instant at which the hand of the operator is taken off of said input device until said menu display controller terminates the display of the menu of the hierarchical menu,
    wherein said menu display controller terminates the display of the menu of the hierarchical menu after the set delay time has passed from an instant when the hand of the operator is taken off of said input device.

2. An information display device according to claim 1, wherein said delay time setting means is operable to set the delay time to be longer as a level of a displayed menu is lower in hierarchy, when a plurality of menus of the hierarchical menu are provided in a hierarchical manner on lower hierarchical levels of an initial menu that is a menu displayed when the hand of the operator enters the range.

3. An information display device according to claim 2, further comprising:
    an operation completion detector operable to detect completion of an operation of the apparatus,
    wherein said delay time setting means is operable to set the delay time to be shorter when the operation of the apparatus is completed than when the operation of the apparatus is not completed.

4. An information display device according to claim 1, further comprising:
    an operation history memory operable to store an operation history based on the inputted switch signal,
    wherein said delay time setting means is operable to set the delay time based on the operation history.

5. An information display device according to claim 2, further comprising:
    an operation history memory operable to store an operation history based on the inputted switch signal,
    wherein said delay time setting means is operable to set the delay time based on the operation history.

6. An information display device according to claim 4, further comprising:
    an operation completion detector operable to detect completion of an operation of the apparatus,
    wherein said delay time setting means is operable to set the delay time to be shorter when the operation of the apparatus is completed than when the operation of the apparatus is not completed.

7. An information display device according to claim 5, further comprising:
    an operation completion detector operable to detect completion of an operation of the apparatus,
    wherein said delay time setting means is operable to set the delay time to be shorter when the operation of the apparatus is completed than when the operation of the apparatus is not completed.

8. An information display device according to claim 1, further comprising:

an operation completion detector operable to detect completion of an operation of the apparatus, wherein said delay time setting means is operable to set the delay time to be shorter when the operation of the apparatus is completed than when the operation of the apparatus is not completed.

* * * * *